Nov. 15, 1960

W. M. LEADERS ET AL 2,960,398

DIRECT INGOT PROCESS FOR PRODUCING URANIUM

Filed Aug. 16, 1957

INVENTOR.
William M. Leaders
Walter S. Knecht
BY

Roland A. Anderson
Attorney

United States Patent Office 2,960,398
Patented Nov. 15, 1960

2,960,398

DIRECT INGOT PROCESS FOR PRODUCING URANIUM

William M. Leaders, Webster Groves, and Walter S. Knecht, Kirkwood, Mo., assignors to the United States of America as represented by the United States Atomic Energy Commission Filed Aug. 16, 1957, Ser. No. 682,072

6 Claims. (Cl. 75—84.1)

This case relates to the production of uranium ingots, and more particularly, to the production of uranium ingots suitable for forging, from uranium tetrafluoride in a single-step reduction process wherein highly purified carbon-free uranium is formed.

The present process for producing uranium metal involves the digestion and extraction of uranium from the ore to form uranyl nitrate hexahydrate that is denitrated to form uranium trioxide ($UO_3$), known as orange oxide, the reduction of orange oxide to uranium dioxide ($UO_2$), known as brown oxide, by hydrogen according to the reaction $$UO_3 + H_2 \rightarrow UO_2 + H_2O$$

the hydrofluorination of brown oxide to uranium tetrafluoride ($UF_4$), known as green salt, with anhydrous hydrogen fluoride according to the reaction $$UO_2 + 4HF \rightarrow UF_4 + 2H_2O$$

and, finally, the thermite reduction of uranium salts by magnesium metal to form uranium metal and magnesium fluoride slag ($MgF_2$) according to the reaction $$UF_4 + 2Mg \rightarrow U + 2MgF_2 + \frac{630 \text{ B.t.u.}}{\text{pound uranium}}$$

Although the reduction of green salt with magnesium metal is the major reaction that occurs in the final step, other minor reactions occur at the same time that affect the efficiency of producing uranium in one massive piece of metal. These reactions include the magnesium reduction of any orange oxide that is not converted to green salt in the previous operations according to the reaction $$UO_3 + 3Mg \rightarrow U + 3MgO + 1070 \text{ B.t.u./pound uranium}$$

and the magnesium reduction of brown oxide not converted to green salt in the previous operations according to the reaction $$UO_2 + 2Mg \rightarrow U + 2MgO + 260 \text{ B.t.u./pound uranium}$$

Uranium oxyfluoride also known as "water soluble" is formed by hydrofluorinating unreacted orange oxide according to the reaction $$UO_3 + 2HF \rightarrow UO_2F_2 + H_2O$$

The combination of brown oxide and orange oxide, a small amount of which remains in the green salt, is known as "ammonium oxalate insoluble." A typical lot of green salt used in the magnesium reduction process of uranium tetrafluoride would be reported analytically as containing approximately 97.5% uranium tetrafluoride, 1.0% "ammonium oxalate insoluble," and 1.5% "water soluble."

The thermite reactions described above are simultaneously carried out in a refractory-lined container or autoclave known as a bomb which is first heated in order to initiate the reactions and then cooled to handling temperatures to facilitate the mechanical separation of the slag from the metal. The present operations produce disk-shaped pieces of metal known as derbies which, because of their size and shape, must be melted down in crucibles and cast to form an ingot that has a shape which is more amenable to fabrication than an individual derby. The separate steps of remelting the derbies and recasting them into ingots in preparation for forging processes are unduly expensive in relation to the amount of uranium metal produced; material handling costs as well as the time consumption per unit of metal produced are considerable. Another disadvantage of the prior methods for producing uranium metal is the presence of oxide contaminations on the finished metal. Reheating the derbies, to melt the uranium so that they may be poured into molds having shapes suitable for forging, causes oxides to be formed. Pouring the remelted uranium into magnesium oxide coated graphite molds also causes carbon and magnesium to be present in the ingots as contaminants. A substantial amount of nitrogen is also present in the final ingots. It is, therefore, an object of this invention to provide a process for the production of uranium metal ingots suitable for forging, in a one-step reduction process using uranium tetrafluoride with magnesium.

It is another object of this invention to provide a suitable apparatus for producing uranium metal directly into ingot form in a one-step reduction process.

It is another object of this invention to provide a single-step reduction process for the reduction of uranium metal ingots in which a high yield is obtained.

Still another object of this invention is to provide a process for the production of uranium ingots which have a low contamination of carbon, oxides, magnesium, and nitrogen.

The present invention comprises a method and apparatus for forming ingots (hereinafter called "dingots" when formed by the process of this invention) of substantially pure uranium in a one-step process, eliminating the need for remelting the mass of uranium produced in the reduction process to pour it into molds to shape the metal in more advantageous forms for forging. A substantial amount of time, energy, and expense was expended developing, testing, and perfecting the invention wherein a uranium salt is reduced to substantially pure uranium and directly cast into forgeable "dingots" by uniformly preheating in an autoclave the salt mixed with a suitable substance and heating from beneath until the reaction occurs. The autoclave is so shaped that the reduced molten uranium settles in the bottom portion thereof and is cast into a forgeable shape as it is cooled.

The invention will be better understood with a further reading of the specification in reference to the drawings, in which:

Fig. 1 is an elevation view in cross section showing the reduction bomb as it is loaded prior to firing;

Fig. 2 is an elevation view of the reduction bomb of Fig. 1 as it is situated in the furnace during firing. It has a cut-away portion showing the contents of the bomb after firing has taken place.

The reduction autoclave or bomb shell 11 comprises an upper section 12, a lower section 13 and cover plates 14 and 15 for the top and bottom, respectively. The upper section 12 is formed of a hollow right frustum of a cone having flanges 16 and 17 at its upper and lower edges, respectively, the mean diameter of the section 12 being approximately equal to its height. The lower section 13 has a lower portion 18, comprising a hollow right frustum of a cone with a mean diameter substantially smaller than that of the upper section 12 and approximately equal to its own height. The lower section 13 also has an upper portion 19 formed by a hollow inverted truncated cone which serves as an adapter between the bottom of the upper section 12 and the lower portion 18 of the lower section 13. Around the top edge of the lower section 13 is formed a flange 20 conforming to the flange 17 on the lower end of the upper section 12 and is fastened thereto by means of bolts 21. Another flange 22 is formed around the lower edge of the lower section 13 and receives the lower cover plate 15 by means of bolts 23. The upper cover plate 14 is fastened to the flange 16 of the upper section 12 by means of the bolts 24.

Right frustums of cones with a taper of approximately 2% are used for the upper section 12 and the lower portions of the lower section 13, rather than right cylinders, to facilitate easier unloading. Experience with several bombs shows that the cross-sectional shape controls the rate of cooling of the products and subsequently, to a major degree, the efficiency of separation. In addition to controlling the rate of cooling, the shape has to be such as to permit uniform cooling, or the metal produced may have slag trapped in the faster cooling portions of its mass such as in the case of a square cross section where the corners would cool faster than the sides or in an oval or oblong cross section where the ends would cool faster than the center. Thus, the geometry of the bomb chosen for use in this invention is such that both the upper section 12 and the lower section 13 have essentially circular cross sections and minimum surface to volume ratios, thus affording the slowest rate of cooling possible by virtue of any practical shape. The one-step reduction process and apparatus described herein has been developed for the production of uranium "dingots" weighing approximately 3300 pounds with a mean diameter and height of approximately 18 inches.

The bomb shell 11 must be constructed of a material that will resist the attack of magnesium vapors that frequently contact it, as well as resist deformation under the heating and cooling conditions used. Distortion of the shell frequently occurs: this makes removal of the reactor products from the shell more difficult and eventually causes either more liner to be used, which becomes an additional heat sink to cause inefficient separation of the products before they solidify, or less liner to be used, which incurs the danger of allowing the molten products to melt through the liner and bomb resulting in what is known as a blow-out. It has been found that a three-quarter inch thick mild steel such as A283–46T is adequate for fabricating a bomb shell which will produce 3300-pound "dingots."

When green salt is reduced to uranium metal by the bomb reduction method, a refractory liner must be used to protect the bomb from the intense heat developed at the time of the reaction and from corrosive attack by the uranium metal, thereby protecting the uranium from contamination by the bomb material. In addition to this function, the liner, since it comes in contact with the uranium formed, must be relatively free of impurities such as silica and boron and have sufficient green strength at the time it is formed to permit a charge to be packed into the lined shell without mixing of the lining material with the charge. The final requirement for the liner material is that it have sufficient fired strength at the time of the reaction to resist being washed into the uranium melt formed and, especially when "dingots" are formed, thus to permit the formation of smooth surfaces on the metal regulus. It has been found that magnesium fluoride, a by-product of previous operations of the inventive process, meets the above requirements. A slag liner material having the following screen analysis is adequate for producing highly pure uranium "dingots":

| | Percent |
|---|---|
| +20 mesh | 0 |
| −20+60 mesh | 5 |
| −60+80 mesh | 5 |
| −80+100 mesh | 5 |
| −100+200 mesh | 25 |
| −200+325 mesh | 20 |
| −325 mesh | 40 |

The slag liner is formed by first placing the bomb shell 11 on an air-operated jolter and introducing a sufficient amount of slag to form the bottom 25 of the liner. A mandrel (not shown) is inserted into the bomb shell 11 and is centered therein by means of a flange on the mandrel coinciding with the flange of the shell. The annular space between the mandrel and the bomb shell is filled with slag while the shell is being jolted to form the remainder of the liner 26. The mandrel is then removed so that the cavity 27 formed by the mandrel can be filled with the charging ingredients. The lower part of the cavity formed in the lower portion 13 of the bomb shell 11 serves as a mold 27a for the uranium mass after the reduction reaction. For the production of 3300-pound "dingots," a 2½-inch liner has been used successfully without incurring any blow-outs.

The reactants, green salt and magnesium, must be intimately mixed together before they are fired to promote the completeness of the reaction. For a 3300-pound "dingot," 4455 pounds of green salt (theoretical uranium content of 3384 pounds) and 703 pounds of magnesium metal chips (representing 101% of the stoichiometric requirement, or 1% excess) are mixed in a blender and discharged into the cavity 27 in the refractory-lined bomb.

The presence of "water soluble" and "ammonium oxalate insoluble" in the mixture affects the firing conditions and consequently the efficiency of the reduction process. Increased quantities of "water soluble" increases the firing time of a charge thus permitting more heat to enter the bomb before firing. At the same time additional heat is supplied to the reduction mass by virtue of the higher heat of reaction between "water soluble" and magnesium as compared to the $UF_4$ and magnesium reaction. It would appear beneficial to use large percentages of "water soluble" on this basis. However, the reduction of "water soluble" produces magnesium oxide as well as magnesium fluoride according to the reaction $$UO_2F_2 + 3Mg \rightarrow U + 2MgO + MgF_2$$

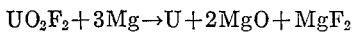

$$+1250 \frac{\text{B.t.u.}}{\text{pound uranium}}$$

which contributes to forming a higher melting slag than normal magnesium fluoride. Thus, experience has shown a "water soluble" content within the limits of from 1.4% to 2.1% to be desirable from a yield standpoint. "Ammonium oxalate insoluble" has a much lower heat of reaction with magnesium (420 B.t.u./pound uranium) than $UF_4$ (630 B.t.u./pound) and is therefore detrimental to the process. From an economic standpoint, a maximum limit of 1.0% "ammonium oxalate insoluble" is chosen for the production of the 3300-pound "dingots."

The filled bomb is moved out from under the blender where the charge can then be manually packed with the aid of a long stainless steel rod. The packing is accomplished by forcing the rod down into the green salt magnesium mixture and rotating the rod to work out the entrapped air and to allow the material to settle. The top of the charge is then smoothed out and packed with an air-operated sand rammer. A layer 28 of magnesium fines or calcium is placed on top of the charge as a getter to reduce the hydrogen content in the finally reduced uranium metal "dingot." A magnesium fluoride slag cap 29 approximately 4 inches thick is formed over the layer 28 and packed with an air-operated sand rammer so that it is level with the top of the flange 16 of the bomb shell. The upper plate cover 14 is bolted into place and the bomb is ready for firing.

The loaded bomb is placed in a furnace 31, as shown in Fig. 2, which has separate heating elements 32 in its lower portion and along its floor which can be operated independently of heating elements 33 in the remainder of the furnace. Since the heat of reaction is insufficient, even under adiabatic conditions, to maintain the reaction products molten until they separate to form a "dingot," the furnace must supply the heat to initiate the reaction and the heat required to bring about an efficient separation of the products. Thus, the more heat the reactants can absorb before they react, the more efficient should be the separation of the products and the higher the purity of the final metal. The charged bomb, therefore, is preheated for a substantial time in the furnace with all elements 32 and 33 operating. All heating elements 33 are then turned off, and the charge is heated by elements 32 until the reduction takes place. Extensive tests were made to determine the optimum firing conditions by varying the operation of the heater elements in the furnace. It will be noted that the furnace used had its top elements separately controllable and certain runs were made with them operating alone. The following table gives the results of the tests.

dismantled and the slag is chipped away from the top of the "dingot."

In machining the 3300-pound "dingot" in preparation for forging processes, approximately 1 inch is scalped off the top and approximately one-half inch is removed from the other surfaces. The scalping of the ingot removes any slag impurities which tend to accumulate near the top surface of the "dingot." Any magnesium or nitrogen found in the "dingot" is generally concentrated along the outer surfaces and is thereby removed. The presence of carbon and oxides in the final uranium is practically negligible in comparison with that present in ingots formed by the old method due to the elimination of the steps of reheating and melting of the uranium and pouring into magnesium oxide coated graphite molds. The

*Summary of 3300-pound dingot firing conditions and associated data*

| Preheat Conditions | Firing Condition | Average Bomb Yield, Percent | No. of Cases | Surface Conditions |
|---|---|---|---|---|
| None | 1,200° F., BEO a | | | |
| 2 hours—800° F., All b | 1,150° F., BEO | 95.2 | 10 | |
| 3 hours—800° F., All | 1,150° F., BEO | 89.7 | 1 | |
| 4 hours—800° F., All | 1,150° F., BEO | 92.5 | 9 | |
| 8 hours—800° F., All | 1,150° F., BEO | 95.3 | 8 | 40% Fair, 60% Poor. |
| 12 hours—800° F., All | 1,150° F., BEO | | | |
| None | 1,150° F., All | 91.2 | 3 | 100% Poor. |
| None | 1,150° F., TEO c | 90.8 | 3 | 100% Poor. |
| None | 1,150° F., BEO | 91.6 | 10 | 50% Good, 50% Fair. |
| 5 hours—1,150° F., TEO | 1,150° F., BEO | 94.7 | 6 | 50% Good, 50% Fair. |
| 5 hours—1,150° F., All | 1,150° F., BEO | 96.1 | 21 | 80% Good, 20% Fair. | a Bottom furnace elements only (BEO).
b All furnace elements (All).
c Top furnace elements only (TEO).

In the production of the 3300-pound "dingots," the maximum yield was obtained by preheating the bomb with all the elements of the furnace at a temperature of 1150° Fahrenheit for approximately 5 hours followed by heating with the bottom elements only at 1150° Fahrenheit until the charge fired. Under these conditions the enthalpy of the entire charge is at or near maximum at the time of firing which causes a better separation of the uranium from the $MgF_4$ slag. The magnesium losses are also reduced and the yield increased by the process of bottom-element-heating during firing, since the top of the bomb is now cooler than the furnace element and acts as a condenser for the magnesium when the bomb fires. It will also be seen in the table above that the surface quality of the "dingots" is markedly improved, thus increasing the final machined yield of the "dingot." Because of heating in this manner at the stated temperatures, the total firing time was approximately 9 hours.

The uranium metal 34 formed (Fig. 2), being heavier than the slag, flows downward into the lower portion 18 of the bomb 11 to form the "dingot." The slag $MgF_2$ 35 remains in the upper portion of the bomb, as shown in the cut-away view in Fig. 2.

After the charge has fired, the bomb is allowed to sit in the furnace for approximately one hour before it is removed to be cooled. This is done primarily as a safety measure since any blow-out generally occurs shortly after firing. The bomb is removed from the furnace and allowed to cool in a normal atmosphere of air. It has been found that the bomb for the 3300-pound "dingot" requires approximately 2 or 3 days under these cooling conditions to cool to approximately 150° Fahrenheit, at which it may be safely handled by personnel. The metal remains molten for approximately 2½ hours after firing under these conditions of cooling, allowing a substantially complete separation to take place. The bomb is purity of a typical "dingot" metal is illustrated by a chemical analysis as follows:

Iron _____ 27 p.p.m.
Manganese _____ 10.
Magnesium _____ 8.
Silver _____ Less than 1.
Nickel _____ 20.
Cobalt _____ Less than 10.
Hydrogen _____ 5.
Nitrogen _____ 18.
Carbon _____ 20.
Silicon _____ 26.
Chromium _____ 5.
Cadmium _____ Less than 0.20.
Boron _____ Less than 0.10.
Oxygen _____ 8.

Since the forging operations are approximately 98% efficient, and the previous operations outlined above are better than 80% efficient, the "dingot" process produces forged bars that represent a yield of approximately 80% uranium from green salt to shapable metal.

The density of "dingot" metal has been determined to be a minimum of 18.96 grams per cubic centimeter which is higher than that of the majority of ingots produced by recasting derbies. The average density for "dingot" metal is approximately 19.02 grams per cubic centimeter. It has also been found that forged "dingot" metal has a substantially finer grain structure than uranium produced in the old two-step ingot process.

It is intended that this invention not be limited to the details set forth above, but only as indicated by the scope of the appended claims.

What is claimed is:

1. A process for forming uranium ingots of sufficient quality and shape for forging comprising the steps, uniformly preheating in a reduction bomb having a mold in its bottom portion, a mixture of uranium tetrafluoride, and at least the stoichiometrically required amount of magnesium to a temperature just below the reaction point; heating the reduction bomb with the mixture only from beneath to the reaction temperature; and cooling in a normal atmosphere of air whereby metallic uranium forms, separates from a slag phase, and flows into the ingot mold.

2. A process preparing uranium metal from technical-grade uranium tetrafluoride, simultaneously separating the uranium metal from impurities contained in the uranium tetrafluoride and also at the same time casting the purified uranium metal into a confined space of predetermined shape, comprising mixing the uranium tetrafluoride with magnesium; charging said mixture into said confined space and piling it thereabove; uniformly preheating the mixture obtained to a temperature just below its reaction temperature; heating only the mixture in said confined space to the reaction temperature whereby a reaction takes place throughout the mixture and uranium metal is formed, withdrawn by gravity from the impurities and collected in said confined space; and cooling the totally reacted end products in a normal atmosphere of air.

3. A process of preparing uranium metal from technical-grade uranium tetrafluoride, simultaneously separating the uranium metal from impurities contained in the uranium tetrafluoride and also at the same time casting the purified uranium metal into 3300 pound cylindrical ingots comprising mixing approximately 4455 pounds of uranium tetrafluoride with approximately 703 pounds of magnesium metal chips; charging said mixture into a confined space and piling it thereabove; uniformly preheating the mixture obtained to a temperature just below its reaction temperature; heating only the mixture in said confined space to the reaction temperature whereby a reaction takes place throughout the mixture and uranium metal is formed, withdrawn by gravity from the impurities and collected in said confined space; and cooling the totally reacted end products in a normal atmosphere of air.

4. The process of claim 3 in which the uranium tetrafluoride has a water soluble content within the limits of from 1.4% to 2.1% and an ammonium oxalate insoluble content of a maximum of 1.0%.

5. The process of claim 3 wherein the mixture is uniformly preheated to a temperature of approximately 1150° F. for approximately 5 hours and heating at approximately 1150° F. only from a source surrounding the ingot mold until the charge fires.

6. A process of preparing uranium metal from technical-grade uranium tetrafluoride, simultaneously separating the uranium metal from impurities contained in the uranium tetrafluoride and also at the same time casting the purified metal into 3300 pound cylindrical ingots, comprising mixing approximately 4455 pounds of uranium tetrafluoride with approximately 703 pounds of magnesium metal chips, said uranium tetrafluoride having a water soluble content within the limits of from 1.4% to 2.1% and an ammonium oxalate insoluble content of a maximum of 1.0%; charging said mixture into a cylindrical ingot mold; uniformly preheating the mixture obtained to a temperature of approximately 1150° F.; heating at approximately 1150° F. only from a source surrounding the cylindrical ingot mold until a reaction takes place throughout the mixture and uranium metal is formed, withdrawn by gravity from the impurities and collected in said ingot mold; and cooling the totally reacted end products in a normal atmosphere of air.

References Cited in the file of this patent

UNITED STATES PATENTS

| | | |
|---|---|---|
| 2,785,972 | Prescott et al. | Mar. 19, 1957 |
| 2,787,537 | Wilhelm | Apr. 2, 1957 |
| 2,830,894 | Spedding et al. | Apr. 15, 1958 |
| 2,852,364 | Spedding et al. | Sept. 16, 1958 |